United States Patent
Roggeman et al.

(12)
(10) Patent No.: US 6,313,232 B1
(45) Date of Patent: Nov. 6, 2001

(54) CONTINUOUS ADDITION OF TIN HALIDES TO SOLUTION SBR

(75) Inventors: David M. Roggeman, North Royalton; Daniel F. Graves, Canal Fulton; William J. Kern, Norton, all of OH (US); Yasuo Horikawa, Kodaira (JP)

(73) Assignee: Bridgestone Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/324,669

(22) Filed: Jun. 3, 1999

(51) Int. Cl.$^7$ ........................................................ C08F 8/42
(52) U.S. Cl. .................. 525/370; 525/332.8; 525/332.9; 525/371; 526/78
(58) Field of Search ............................. 525/332.8, 332.9, 525/370, 371; 526/78

(56) References Cited

U.S. PATENT DOCUMENTS

| 4,397,994 | 8/1983 | Takeuchi et al. . |
| 4,845,165 | 7/1989 | Halasa et al. . |
| 4,942,197 | 7/1990 | Yoshida et al. . |
| 5,587,420 | 12/1996 | Taizawa et al. . |

OTHER PUBLICATIONS

Sierra, C.A. et al., *Rubber Chemistry and Technology*, vol. 68, pp. 259–266.

*Primary Examiner*—Bernard Lipman
(74) *Attorney, Agent, or Firm*—Meredith E. Palmer; John H. Hornickel; Nestor Shust

(57) ABSTRACT

A method of continuously polymerizing a conjugated diene monomer and a vinyl aromatic hydrocarbon monomer in a hydrocarbon solvent by using an organolithium initiator, adding to the polymerization mixture a tin compound and again adding a tin compound after the polymerization mixture has been withdrawn from the polymerization vessel. The resulting diene polymers possess a significantly reduced Payne Effect and a substantial reduction (over 10%) in tan delta at 50° C. which results in tires having decreased hysteresis loss, excellent wear resistance and rolling resistance and good wet skid resistance.

7 Claims, No Drawings

CONTINUOUS ADDITION OF TIN HALIDES TO SOLUTION SBR

BACKGROUND OF THE INVENTION

Diene polymers, including SBR, are well known and various methods of preparing such polymers are also well known in the art. Such rubbers have many applications, especially in tires, because of their excellent wear resistance, low rolling resistance and excellent wet skid resistance without adversely affecting the desirable physical properties of the polymer. For automobile tire applications, rubbers that have low hysteresis loss are especially important for tread applications.

Diene polymers, including SBR, in which the low hysteresis loss property is particularly good have been obtained in the past using an organolithium compound as the initiator in a hydrocarbon solvent polymerization and thereafter coupling a tin compound to the end of the polymer replacing the lithium (Japanese Patent Application laid open No. 1982-55912 and others). According to this method, when a halogenated tin compound is added to the polymerization mixture, the polymerization is deactivated and the molecular structure of the polymer obtained is fixed at the time of the addition of the tin compound. Therefore, in such a method the tin compound is generally added at the end of the polymerization, after the desired molecular weight of the polymer has been reached. Thus, a batch process must be used since the remaining unreacted monomers must be removed.

A more economical continuous polymerization process was disclosed in Japanese patent application laid open No.1988-235305 where a tin compound, such as tin tetrachloride, is added approximately mid-way in the copolymerization of butadiene and styrene. The portion of the polymer chains that forms a tin-carbon linkage will not propagate any longer but the remaining polymer chains that still contain the active lithium end will continue the polymerization. The result of such a process is the formation in the polymerization reaction mixture of a polymer blend containing the higher molecular weight polymers as well as the lower molecular weight polymers. The advantage of this method is the formation of a blend without the need for using separate blending step. The disadvantage of the continuous polymerization process is that a wide molecular weight distribution of the polymer is obtained and such polymers as a rule have inferior hysteresis property. In this respect the batch process is preferred because there is a much better control of polymerization conditions making it possible to obtain diene polymers with a much narrower molecular weight distribution. Such polymers possess a better hysteresis property. The disadvantage of the batch process is that it is less economical.

The above-described methods of preparing diene/vinyl monomer copolymers did not yield polymers which contain a proper balance between the wear resistance, rolling resistance and wet skid property because such polymers did not have the proper balance between the amount of the styrene and the butadiene and the proper balance between the various molecular weights of the chains. When the vinyl content of the butadiene part of styrene-butadiene copolymer in the rubber composition is increased, the fracture properties and the wear resistance is decreased but the wet skid property of the tire is improved. Thus, optimizing the content of the bound styrene, the microstructure of the butadiene part and the molecular weight distribution are insufficient to obtain a rubber composition that can satisfy the various requirements of low rolling resistance (i.e. low hysteresis loss) and good wet traction that are important for tire tread.

To obtain such a desired balance of properties U.S. Pat. No. 5,587,420 discloses a method of polymerizing a conjugated diene monomer or a mixture of a conjugated diene monomer and a vinyl aromatic hydrocarbon monomer in a hydrocarbon solvent by using an organolithium compound as the initiator with the addition of an organotin compound, including halogenated tin compounds, to the polymerization system in a period of growth of the polymer chain between a time immediately after the start of the polymerization to a time before the end of the polymerization. It is important to note that the tin compounds are added to the polymerization reaction only once and the disclosed method is a batch process.

SUMMARY OF THE INVENTION

An object of the present invention is an economic continuous polymerization process of polymerizing a conjugated monomer and preferably also an aromatic vinyl monomer, to yield rubbers which possess superior physical properties such as low hysteresis loss, low rolling resistance and good wet traction.

Thus present invention is directed to a method, which comprises continuously polymerizing a conjugated diene monomer or a mixture of at least one conjugated diene monomer and a vinyl aromatic hydrocarbon monomer in a hydrocarbon solvent by using an organolithium compound as the initiator, adding to the polymerization mixture a tin compound at a point when the monomer conversion has reached between 25 and 80% conversion and again adding a tin compound after the polymerization mixture has been withdrawn from the polymerization vessel.

The unexpected result of the process of this invention is in the improvement in the physical properties of the resulting diene polymers. Thus when butadiene/styrene is copolymerized employing the process of this invention, the resulting polymers possess a significantly reduced Payne Effect as compared to the polymer obtained by the method disclosed in the '420 patent where a tin compound was added only once, only during the polymerization. Furthermore, the polymers obtained by the method of this invention possess a substantial reduction (over 10%) in tan delta at 50° C. as compared to the polymers prepared by the method of said patent.

DETAILED DESCRIPTION OF THE INVENTION

The invention is specifically directed to an improved method producing a diene polymer comprising the steps of:

(a) polymerizing in a continuous process a conjugated diene monomer or a mixture of a conjugated diene monomer and a vinyl aromatic hydrocarbon monomer in a hydrocarbon solvent using an initiator comprising an organolithium compound;

(b) adding at least one tin compound to the polymerization vessel; and (c) adding additionally at least one tin compound to the polymerization mixture after it has been withdrawn from the polymerization vessel.

The improved continuous polymerization process yields diene polymers which possess decreased hysteresis loss, have excellent wear resistance and rolling resistance and exceptionally good wet skid resistance.

A continuous diene polymerization process of this invention comprises:

i) continuously introducing into a reactor a diene monomer and an aromatic vinyl compound, a hydrocarbon solvent, a polymerization initiator and a tin compound;

ii) continuously agitating the content of a reactor while effecting the polymerization reaction to form the diene polymer;

iii) continuously withdrawing the polymer from the reactor; and iv) continuously adding a tin compound to the stream being withdrawn from the reactor.

The resulting diene polymers, preferably copolymers of a diene such as 1.3-butadiene and an aromatic vinyl compound such as styrene, have an average molecular weight of greater than about 100,000.

The polymers having improved properties that are obtained by the process of this invention are prepared from conjugated diene or a mixture of conjugated diene and vinyl hydrocarbons. The conjugated diene monomers normally have 4 to 12 carbon atoms, preferably 4 to 8 carbon atoms. Examples of the conjugated dienes are 1,3-butadiene, 1,3-pentadiene, 2-methyl-1,3-pentadiene, 4-butyl-1,3pentadiene, 1,3-hexadiene, 1,3-octadiene, 2,3-dimethyl-1-, 3-butadiene, piperylene, 2,3-dibutyl-1,3-pentadiene, 2-ethyl-1,3-pentadiene, 2-ethyl-1-3-butadiene, 3-butyl-1,3-octadiene, 2-phenyl-1,3-butadiene, and the like. The conjugated diene may be used singly or as a combination of two or more of such dienes. The particularly preferable diene is 1,3-butadiene.

Examples of the vinylaromatic hydrocarbon include styrene, α-methylstyrene, p-methylstyrene, o-methylstyrene, p-butylstyrene, vinylnaphthalene and the like compounds. Among them styrene is particular preferable.

The solvent for the polymerization is an inert organic solvent. For example, an aromatic hydrocarbon solvent, such as benzene, toluene, xylene and the like, an aliphatic hydrocarbon solvent, such as n-pentane, n-hexane, n-heptane and the like, an alicyclic hydrocarbon solvent, such as methylcyclopentane, cyclohexane and the like, or a mixture of these solvents can be used.

According to the present method, an organolithium compound initiates the polymerization. Examples of the organolythium compound used as the initiator in the method of production of the present invention are alkyllithiums, such as n-butyllithium, ethyllithium, propyllithium, tert-butyllithium, hexyllithium, 1,4-dilithiumbutane, reaction products of butyllithium and divinylbenzene and the like, alkylenedilithiums, phenyllithium, stilbenedilithium and the like. The preferable examples are n-butyllithium and tert-butyllithium. The organolithium initiator may be used as a single or as a mixture of two or more of said initiator compounds. The organolithium compound can be used in an amount in the range of from 0.2 to 30 millimol per 100 g of the monomer.

A critical feature of this invention is the addition of one or more tin compounds in a continuous polymerization to the polymerization vessel, after 25–80% and preferably 50–80% of the monomer has been converted to the polymer, and then again adding continuously one or more tin compounds to the polymerization mixture while it is being withdrawn from the polymerization vessel.

A variety of organotin or halogen containing tin compounds may be employed. The organotin compounds may be represented by the formula $SnR_4$ where the R group is allyl, benzyl or a phenyl moiety-containing group such as phenyl, tolyl, naphthyl and the like. The preferred groups are phenyl and tolyl. When the R in the formula are the same the illustrative examples are tetraallyltin, tetrapolybutadienyltin, tetrabenzyltin, tetrapolystyryltin, tetraphenyltin and the like. When the R groups are different, the examples are allyltriphenyltin, diallyldiphenyltin and the like. Vinyltriphenyltin and the like can also be used. The R group in the formula $SnR_4$ should have the allyl structure, the benzyl structure and/or the phenyl structure. When at least one of the R is a group other than said groups, such as an alkyl group for example, the compound is not preferable because the polymer containing the chain having the tin-carbon bond is not formed, and the hysteresis loss of the rubber component and the rolling resistance of the rubber composition using the rubber component are increased.

The halogenated tin compound used in present invention is expressed by the formula $SnX_n$. When n is 2, the compound is expressed by the formula $SnX_2$. When n is 4, the compound is expressed by the formula $SnX_4$.

Examples of $SnX_2$ are tin dichloride, tin dibromide and the like. The amount of $SnX_2$ added to the reaction system is in the range of less than 0.5 to 0.12 or more mol equivalent based on 1 mol equivalent of the lithium at the active end of the polymer.

Examples of $SnX_4$ are tin tetrachloride, tin tetrabromide and the like. The amount of $SnX_4$ added to the reaction system is in the range of less than 0.25 to 0.18 or more mol equivalent based on 1 mol equivalent of the lithium at the active end of the polymer.

When the amount of the added halogenated tin compound to the lithium at the active end of the polymer is 0.5 mol equivalent or more in the case of $SnX_2$ and 0.25 mol equivalent or more in the case of $SnX_4$, the polymerization is not continued at all because the lithium at the active end of the polymer no longer remains and the polymer containing the chain having the tin-carbon linkage is not formed. When this amount is less than 0.12 in the case of $SnX_2$ and less than 0.18 in the case of $SnX_4$, the relative concentration of lithium at the free active end of polymer, which is considered to be irrelevant to the formation of the starting point of the polymer containing the chain having the tin-carbon linkage, to the concentration of the starting point of the polymer containing the chain having the tin-carbon linkage is increased even though the chain of the polymer containing the chain having the tin-carbon linkage is formed. Thus, the polymerization which does not effect the tin at the active end proceeds predominantly. The ratio of the polymer containing the chain having the tin-carbon linkage relative to the polymer containing no chain having the tin-carbon linkage in the obtained polymer is decreased, and the content of the former polymer in the total polymer obtained is reduced to less than 50%, sometimes less than 40%. This causes inferior results with respect to the desired properties, and is therefore unfavorable.

It is preferable that the tin compound used in the first addition, i.e., added to the polymerization vessel, contains one or more halogens as may be represented by the formula $R^1_{4-z}SnX_z$ or $SnX_z$ where z is 1 to 4 and $R^1$ is an alkyl of 1–8 carbons and X is a halogen. Illustrative examples of the tin compounds of this class are tributyltin chloride, dibutyltin dichloride, tin tetrachloride and the like. Such preferred halogen containing compounds may also be tin dihalides such as tin dichloride, or other tin halides mentioned above.

The time at which the first addition of an organotin compound or preferably a halogenated tin compound is made to the polymerization vessel is important because if added too early, the resulting polymer chains will tend to be shorter and if added too late in the polymerization, relatively less carbon-tin linkages will be formed. In a continuous polymerization process the solution of a tin compound is preferably metered into the polymerization vessel at a point when the monomer conversion has reached preferably between 25% to 80% of the monomer and most preferably between 50% and 80%.

The amount of the organotin compound expressed by the formula $SnX_4$ which is added to the lithium at the active end of the polymer can be expressed by the mole equivalent ratio of tin/lithium. This ratio affects the polymerization activity, the content of the polymer containing the chain having the tin-carbon linkage in the polymer and the molecular weight of the polymer to a great extent. When the mol equivalent ratio of tin/lithium is increased, the polymerization activity is decreased, and a relatively low molecular weight polymer which includes a larger amount of the polymer containing the chain having the tin-carbon linkage is obtained. On the other hand, when this ratio is decreased, the inverse tendency appears: the polymerization activity is increased, and a relatively high molecular weight polymer which includes a smaller amount of the polymer containing the chain having the tin-carbon linkage is obtained. When the content of the polymer containing the chain having the tin-carbon linkage in the rubber material of the present invention is higher, the hysteresis loss is lower, and consequently the rolling resistance of the rubber composition using the polymer is lower. Thus, a higher content of this polymer is favorable. The method of the present invention can result in a considerably higher content than the conventional methods. Because the content of this high molecular weight polymer depends on the ratio of the lithium and the organotin compound or the halogenated tin compound as described above, polymers suited for the applications can be obtained easily as desired by selecting the amount of addition of the tin compound relative to the amount of the lithium at the active end of the polymer.

For the purpose of increasing the polymerization activity and/or the adjustment of the molecular structure of the polymer such as the molecular weight, the microstructure and, additionally in the case of copolymers, the compositions of the monomer units, the distribution of the monomer units and the like, as desired according to the applications, additives generally used for these purposes, such as Lewis bases like other compounds, tertiary amine compounds and the like, may be added to the reaction system. Examples of the ether compound are: diethyl ether, dibutyl ether, tetrahydrofuran, 2-methoxytetrahydrofuran, 2-methoxymethyltetrahydrofuran, dioxane, ethylene gycol dibutyl ether, dicthylene glycol dimethyl ether, diethylene glycol diethyl ether, diethylene glycol dibutyl ether, triethylene glycol dimethyl ether and the like. Examples of the tertiary amine are: triethylamine, tripropylamine, pyridine, N,N,N',N'-tetramethylethylenediamine, N,N,N',N'-tetramethylethylenediamine, N-methylmorpholine and the like. The amount of the ether compound or the tertiary amino compound is in the range of 0.05 to 1000 mol based on 1 mol of the organolithium compound.

The temperature of polymerization is generally in the range of −20° to 150° C. and preferably in the range of 0° to 120° C.

The concentration of the monomer in the solvent is generally in the range of 5 to 50 weight % and preferably in the range of 10 to 35 weight %. In the case of the copolymerization of a conjugated diene and a vinylaromatic hydrocarbon, the content of the vinylaromatic hydrocarbon in the charged monomer is in the range of 3 to 50 weight %.

The polymerization reaction can be performed by bringing the monomer into contact with the catalyst in the liquid phase. It is preferred that the reaction is operated under the pressure sufficient for essentially holding the liquid phase. It is also preferred that substances adversely affecting the catalytic activity are eliminated from all of the substances charged into the reaction system.

The present invention is directed to a continuous polymerization process. In such a process the monomer and the initiator are fed into the reactor at one end and the polymerization takes place as the polymerization mixture moves at a predetermined rate through the reactor until the reaction mixture that contains primarily the desired polymer (generally at least 90% of the monomers having been polymerized) is continuously removed at the other end of the reactor. The resulting polymer mixture is continuously piped into a holding vessel where it is further processed to obtain the final product.

According to the present invention the second addition of a tin compound, preferably in the form of a solution similarly as the first addition to the polymerization vessel, is made inline to the polymer mixture as it is being withdrawn from the polymerization vessel and transferred to the holding vessel. Any tin compound may be added at this stage, including organotin compounds or halogenated tin compounds. The tin compound used in the second addition may be the same or different than the tin compound used in the first addition. Actually, any coupling agents or compounds that are reactive with lithium may be used at this stage. The amount of the tin compound used is similar as in the first addition as disclosed above. The resulting mixture is generally maintained in the holding tank from 15 minutes up to about one hour when the tank is ready for further processing. This normally includes first the addition of an alcohol to stop any further reaction, steam stripping the solvent and drying the resulting solid polymer.

In this stage, the tin compound is added in about the same amount as in the first addition. The tin displaces the lithium, forming the carbon-tin linkage whereby polymer chains become attached to tin. This step unexpectedly further improves the properties of the diene rubber, such as further decreasing the hysteresis loss and improving the wear resistance, rolling resistance and wet skid resistance properties.

In the present invention, the content of the vinyl structure derived from the conjugated diene, particularly from 1,3-butadiene, contained in the polymer is preferably in the range of 10 to 70 weight %. When the content is more than 70 weight %, the fracture properties are decreased although the wet skid resistance is increased. Therefore, the content of more than 70 weight % is not preferable. The content of the vinylaromatic hydrocarbon in the copolymer, particularly the content of the bound styrene, is preferably in the range of 3 to 50 weight %. When the content is more than 50 weight %, the rolling resistance is inferior although the wet skid resistance is increased. Therefore, the content of more than 50 weight % is not preferable.

The polymers described above may be blended with natural rubber or other synthetic rubbers. In such blends, it is necessary that the polymer described above is comprised in an amount of 30 weight % or more, preferably 50 weight % or more, in the rubber material. When the amount is less than 30 weight %, the wet skid resistance is decreased and the balance of the properties required of the rubber composition deteriorates. Thus, an amount less than 30 weight % is unfavorable.

Examples of the synthetic rubber used for the blending described above are cis-1,4-polyisoprene, styrene-butadiene copolymers, low cis-1,4-polybutadiene, high cis-1,4-polybutadiene, ethylene-propylene-diene copolymers, chloroprene polymers, halogenated butyl rubbers, acrylonitrile-butadiene rubber (NBR) and the like.

The amount of carbon black compounded in the rubber composition of the invention is in the range of 20 to 100 weight parts, preferably in the range of 25 to 80 weight parts, based on the rubber material described above. When the amount is less than 20 weight parts, the tensile strength and the wear resistance of the vulcanized product is insufficient. When the amount is more than 100 weight parts, the amount is not preferable with respect to the rolling resistance (hysteresis loss) and the like. A carbon black, such as HAF, ISAF, SAF and the like, can be used for the rubber composition. Carbon blacks having the iodine absorption (IA) of 60 mg/g or more and the absorption of dibutyl phthalate (DBP) of more than 80 ml/100 g are preferably used.

The vulcanizing agent is sulfur or the like. The amount of the vulcanizing agent is in the range of 0.1 to 5 weight parts, preferably in the range of 1 to 2 weight parts based on 100 weight parts of the rubber material. When the amount is less than 0.1 weight parts, the tensile strength, the wear resistance and the hysteresis loss are inferior. When the amount is more than 5 weight parts, the rubbery resilience is lost.

The process oil which can be used in the present invention is a paraffinic oil, a naphthenic oil or an aromatic oil. The aromatic oil is used for applications in which tensile strength and wear resistance are important. The naphthenic oil or the paraffinic oil is used for applications in which the hysteresis loss and the low temperature properties are important. The amount used in the range of 0 to 100 weight parts based on 100 weight parts of the rubber material. When the amount is more than 100 weight parts, the tensile strength and the hysteresis property of the vulcanized rubber deteriorates to a great extent.

The vulcanization accelerator which can be used in the invention is not particularly limited and preferable examples are thiazole acceleratores, such as M (2-mercaptobenzothiazole), DM (dibenzothiazyl disulfide), CZ (N-cyclohexyl-2-benzothiazylsulfenamide) and the like, guadine acceleratores, such as DPG (diphenylguanidine) and the like. The amount used is in the range of 0.1 to 5 weight parts, preferably in the range of 0.2 to 3 weight parts, based on 100 weight parts of the rubber material.

In the rubber composition of the present invention, other additives generally used in the rubber industry, such as aging resisting agents fillers other than carbon black like silica, calcium carbonate, titanium oxide and the like, zinc oxide, stearic acid, antioxidants, antiozonants and the like, can be compounded in addition to the materials described above.

The rubber composition of the present invention can be obtained by using mixing machines such as rolls, internal mixers and the like. After the processing by molding, the rubber composition is vulcanized and applied to tire applications, such as tire tread, under tread, carcass, side wall, bead parts and the like, as well as to other industrial products such as anti-vibration rubbers, belts, hoses and the like. It is particularly favorably used as the rubber for tire tread.

The invention is further illustrated by the following examples and the comparative testing to show the unexpected improvement by the practice of the invention.

POLYMERIZATION EXAMPLE

The continuous polymerization of this example is conducted in a 10 gallon stirred tank reactor with a length to diameter ratio of about 3:1. A purified blend containing 80% of 1,3-butadiene and 20% styrene in hexane (18.0% total solids) is metered continuously into the reactor. Just prior to entering the reactor, a dilute solution of 2,2'-(tetrahydrofuryl) propane in hexane (modifier) is introduced into the monomer stream. The concentration of the modifier in the hexane is 0.3 millimoles/cc. A 3% solution of butyl lithium in hexane is metered continuously into the reactor at a rate to provide 0.5 gram of active lithium per 100 grams of monomer (PHGM). The continuous polymerization is carried out at a temperature of about 93° C. with a 40-minute residence time. A stream of 0.5% by weight solution of $SnCl_4$ in hexane is metered continuously at approximately one third point from the bottom of the reactor to give a molar ratio of 0.175 $SnCl_4$ to lithium. The amount of $SnCl_4$ may be adjusted during the continuous polymerization to provide maximum coupling while maintaining a good rate of polymerization. The resulting polymerization mixture (after the degree of conversion of the monomer to the polymer is generally at least about 90%) is then withdrawn from the polymerization vessel and a stream of 0.5% by weight solution of $SnCl_4$ in hexane is metered continuously into the withdrawing line to give a molar ratio of 0.1 $SnCl_4$ to lithium. The polymerization mixture is then piped into a holding vessel where it is maintained for about one hour. Then isopropanol is added to stop any further reaction and the mixture is steam stripped of solvents and the resulting polymer is dried.

Comparative Example

Three portions of approximately 300–400 g. each of the polymer cement were withdrawn from the transfer line out of the polymerization reactor in the above-described polymerization (before the second addition of the tin compound) into three nitrogen purged bottles.

Control: Isopropanol was added to the polymer cement in a bottle to terminate the polymerization and then 1% by weight of 3,6-di-tert butyl-p-cresol antioxidant was added.

Sample A: To the polymer cement in another bottle was added $Bu_3SnCl$ as a 10% by weight solution in hexane in a molar amount (based on the chloride) equivalent to 0.04 g. of active lithium per 100 g. of monomer. The bottle was mixed for 15–30 minutes until the color disappeared indicating the completion of the reaction. Then isopropanol and 1% by weight of 2,6-di-tert butyl-p-cresol were added.

Sample B: To the polymer cement in the third bottle was added $SnCl_4$ as a 10% by weight solution in hexane in a molar amount (based on the chloride) equivalent to 0.04 g. of active lithium per 100 g. of monomer. The bottle was mixed for 15–30 minutes until the color disappeared indicating the completion of the reaction. Then isopropanol and 1% by weight of BHT were added.

The above samples were drum dried to remove the solvents and each sample was compounded as described below.

| Additives | Parts |
| --- | --- |
| Natural Rubber | 25 |
| Carbon Black | 48.5 |
| ZnO | 25 |
| Wax | 1.0 |
| Hydrocarbon Resin (Piccotate) | 2.0 |
| Amine Antioxidant (Santoflex 13) | 0.95 |
| Stearic Acid | 2.0 |

-continued

| Additives | Parts |
|---|---|
| Aro Oil | 6 |
| Nap Oil | 5 |
| CBS Accelerator (n-cyclohexyl-2-benzothiazole sulfonamide | 1.4 |
| DPG Accelerator (diaphenyl guanidine) | 0.15 |
| Sulfur | 1.5 |

Compounding: 75 parts by weight of each of the above described sample was compounded by adding to the samples the above listed additives in the amount noted in parts by weight, except for the accelerators and sulfur, and mixing in a Brabender mixer for 6 minutes at 90° C. Thereafter to the resulting compound were added the two accelerators and sulfur and they were mixed for 1 minute and 30 seconds at 105° C.

The following standard tests were performed on the above described three samples that were compounded as described above.

Dynastat Test

This was conducted on Dynastat II at 50° C. This test indicates the hysteresis loss which relates to rolling resistance in a tire; the higher the test value, the greater the hysteresis loss, i.e., the rolling resistance is worse.

| Results: | |
|---|---|
| Control | 0.168 |
| Sample A | 0.150 (12.0% improvement) |
| Sample B | 0.147 (14.3% improvement) |

Strain Sweep Test

The tests were conducted on the Rheometrics RDA 700 at 25° C. using samples of 9.3 mm in diameter ×15.5 mm high obtained from the above-described compounded stock samples. The test was started at 0.25% of strain applied to the samples and increased by 0.25% strain until reaching 14.7% strain, recording the data at each strain level. The below reported test result for each sample was obtained by deducting the G' value at low strain (1%) from the G' value at high strain (14.7%).

This "delta G'" or "Payne Effect" relates to the microdispersion of the carbon black. The higher the delta G', the worse the microdispersion and the higher the rolling resistance. G' is defined as the elastic storage modulus and, in this case, at low strains is actually a measure of the modulus of the carbon black network.

| | |
|---|---|
| Control Sample: | 1.682 dyne/cm$^2$ × 10$^{-7}$ |
| Sample A: | 1.144 dyne/cm$^2$ × 10$^{-7}$ (32% improvement) |
| Sample B: | 1.268 dyne/cm$^2$ × 10$^{-7}$ (25% improvement) |

This test data shows the rolling resistance; the lower the value, the lower the rolling resistance.

When the Polymerization Example is repeated employing tin dichloride, dibutyltin chloride, tetraallyltin or tetraphenyltin as the tin compound added to the polymerization vessel and tin tetrachloride, tin dichloride, tetraallyltin or tetraphenyltin as the tin compound added to the polymerization mixture after it has been withdrawn from the polymerization vessel, substantially similar results are obtained.

What is claimed is:

1. A method of producing a diene polymer comprising the step of continuously introducing into the reactor a conjugated diene monomer or a mixture of a conjugated diene monomer and a vinylaromatic hydrocarbon monomer in a hydrocarbon solvent, a polymerization initiator comprising an organolithium compound while continuously adding at least one tin compound to the polymerization reactor at a point when the degree of polymerization has reached between 25% and 80%.

2. A method of claim 1, wherein the organolithium compound is selected from the group consisting of alkyllithium, alkylenedilithium, phenyllithium and stilbenedilithium and the organotin compound is represented by the formula $R^1_{4-z}SnX_z$ and $SnX_z$ where $R^1$ is alkyl having 1 to 8 carbon atoms, X is a halogen and z is an integer from 1 to 4.

3. A method of claim 2 wherein the organotin compound is selected from the group consisting of tin tetrachloride, dibutyltin dichloride and tributyltin chloride and the first addition of a tin compound is at a point when the degree of polymerization has reached between 50% and 80%.

4. A method of claim 1 wherein another dose of a tin compound is added inline after withdrawing the polymerization mixture from the polymerization vessel but before the polymerization mixture is piped into a holding tank.

5. A method of producing a polymer according to claim 2 wherein the polymer is a polymer of butadiene or a copolymer of butadiene and styrene.

6. A method of claim 2, wherein a halogenated tin compound is continuously added to the polymerization vessel in an amount of less than 0.5 to 0.12 or more mol equivalent based on 1 mol equivalent of the lithium at the active end of the polymer.

7. A method of claim 4, wherein the tin compound is continuously added to the line withdrawing the polymerization mixture form the polymerization vessel in an amount of less than 0.5 to 0.12 or more mol equivalent based on 1 mol equivalent of the lithium at the active end of the polymer.

* * * * *